(12) United States Patent
Bells et al.

(10) Patent No.: US 7,835,759 B2
(45) Date of Patent: Nov. 16, 2010

(54) SYSTEM AND METHOD OF WIRELESS INSTANT MESSAGING

(75) Inventors: Matthew Bells, Waterloo (CA); David M. Haigh, Windsor (CA)

(73) Assignee: Research In Motion Limited, Waterloo (CA)

( * ) Notice: Subject to any disclaimer, the term of this patent is extended or adjusted under 35 U.S.C. 154(b) by 77 days.

(21) Appl. No.: 12/108,649

(22) Filed: Apr. 24, 2008

(65) Prior Publication Data

US 2008/0201430 A1 Aug. 21, 2008

Related U.S. Application Data

(63) Continuation of application No. 10/667,544, filed on Sep. 22, 2003, now Pat. No. 7,379,732.

(51) Int. Cl.
*H04W 4/00* (2009.01)

(52) U.S. Cl. ............... 455/466; 455/518; 455/519; 455/414.1; 455/412.2; 455/416; 709/204; 709/207; 709/206

(58) Field of Classification Search .............. 455/412.2, 455/414.1, 566, 466, 518, 519; 709/206, 709/204, 238, 207
See application file for complete search history.

(56) References Cited

U.S. PATENT DOCUMENTS 6,859,821 B1 2/2005 Ozzie et al.
2002/0083127 A1 6/2002 Agrawal
2002/0165000 A1 11/2002 Fok
2002/0173308 A1 11/2002 Dorenbosch et al.
2003/0005350 A1* 1/2003 Koning et al. ............... 714/4
2003/0083046 A1 5/2003 Mathis
2004/0122901 A1* 6/2004 Sylvain ....................... 709/206
2005/0114783 A1* 5/2005 Szeto ......................... 715/747

FOREIGN PATENT DOCUMENTS

WO 01/045368 A2 6/2001
WO 02/065250 A2 8/2002

* cited by examiner

*Primary Examiner*—Vincent P Harper
*Assistant Examiner*—Dung Lam
(74) *Attorney, Agent, or Firm*—Jones Day; Krishna K. Pathiyal; Robert C. Liang

(57) ABSTRACT

Instant messaging clients transmit, to a server, presence information indicating that the respective client is in a communicative state in which the client is receptive to communicating with the other clients. A server determines, for each client, that the respective client is in a communicative state if presence information was received from the client over a preceding predetermined time period, and that the client is in an unknown state if presence information was not received from the client over the preceding predetermined time period. The communicative state and the unknown state are possible presence states of the clients. The server transmits a notification to a second client of the presence state of a first client when both the first client and the second client are in a communicative state. But the server refrains from transmitting the notification to the second client when the first client is in the unknown state.

15 Claims, 5 Drawing Sheets

SYSTEM AND METHOD OF WIRELESS INSTANT MESSAGING

CROSS-REFERENCE TO RELATED APPLICATIONS

This is a continuation of U.S. patent application Ser. No. 10/667,544, filed Sep. 22, 2003, now U.S. Pat. No. 7,379,732 which claims the benefit of U.S. Provisional Application No. 60/412,818, filed Sep. 24, 2002, both applications hereby incorporated herein by reference.

TECHNICAL FIELD

This invention relates generally to the field of instant messaging. More particularly, the invention provides a system and method of instant messaging to and from wireless devices.

BACKGROUND

Known Instant Messaging (IM) techniques typically send short messages and maintain presence information. One technique for maintaining presence information is the "buddy list." In a "buddy list," users keep a list of correspondents that they regularly communicate with. Correspondents in a "buddy list" typically poll each other for presence information, such as correspondent active, disconnected, etc. The users can glance through the "buddy list" to see if anyone is available to communicate with.

One known IM technique that uses a "buddy list" is ICQ. In ICQ, each correspondent in the "buddy list" sends a message to the user if the correspondent's presence information changes, e.g., if a correspondent disconnects or reconnects to a network. The traditional IM presence information in ICQ is defined using states such as "connected," "chatty," "away," "extended away," "occupied," "do not disturb (DND)," "invisible," and "offline."

Traditional IM techniques may use frequent network traffic communications that may exceed typical wireless network capacity. This occurs because in traditional IM techniques, such as ICQ, presence information is transmitted between stations even in situations where the stations are not presently communicating with one another. This continuous transmission of presence information, regardless of the state of the stations, can result in increased network traffic and a reduction in station battery life, particularly when the station is a wireless mobile communication device.

Furthermore, traditional IM techniques may assume that the users are not always activated and always connected to the network—which may not always be the case with certain wireless network users that maintain constant connectivity.

SUMMARY

A system and method of instant messaging is provided. A plurality of messaging clients capable of transmitting instant messages to one another are each configured to share presence information with one another via a network. A determination is made, with respect to each of the messaging clients, as to whether the messaging client is in a state in which it is receptive to receiving presence information from the other messaging clients, and if so, then the presence information is provided to the messaging client. The presence information may be provided directly between the messaging clients, or it may be provided through one or more centralized proxy servers that store and propagate the presence information. A special state is provided, referred to herein as the unknown state, which when entered by a particular messaging client will cause the system to cease further transmissions of presence information to that client. Upon changing to a communicative state, the system resumes providing presence information to the messaging client.

DETAILED DESCRIPTION

Figure 1:
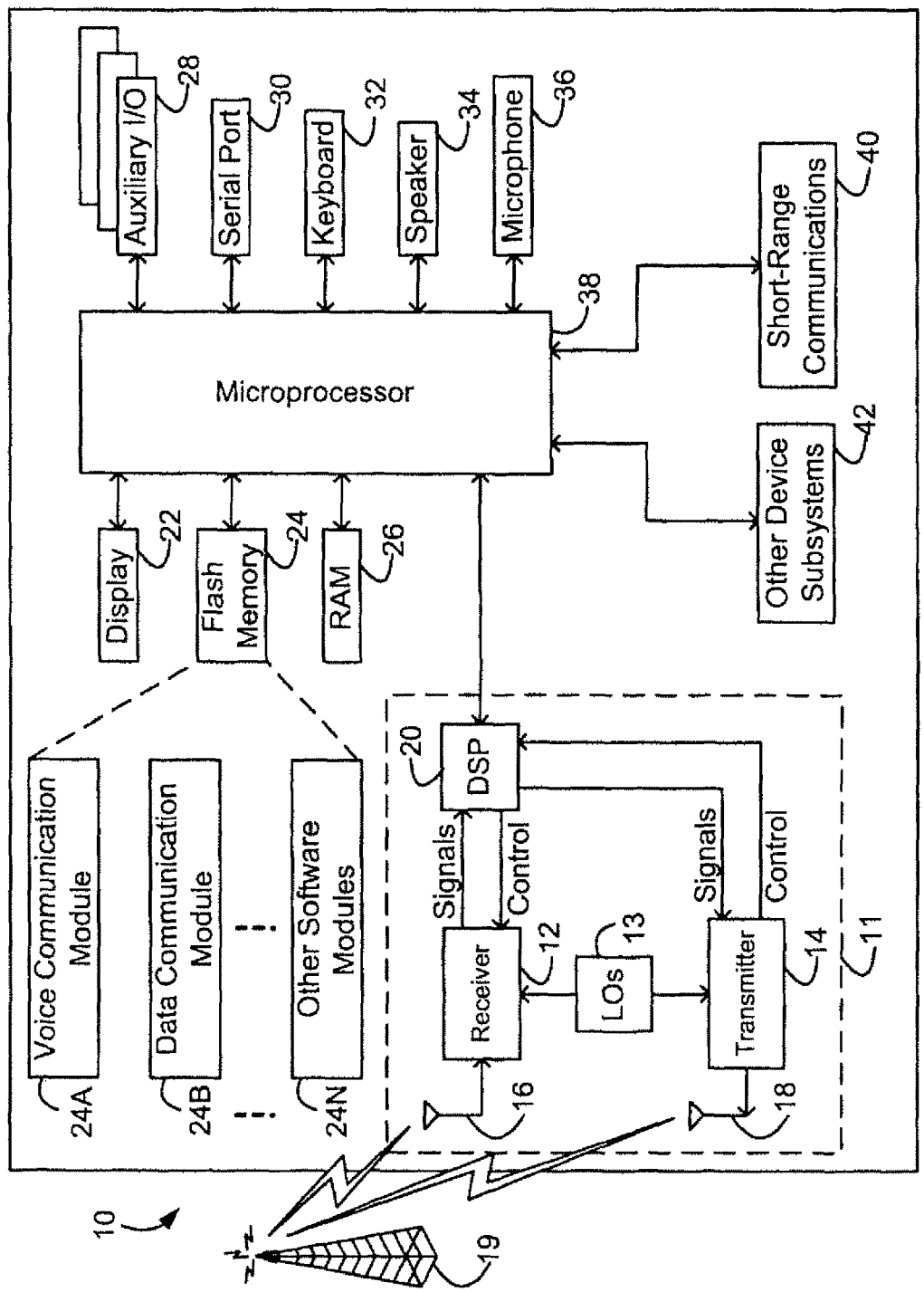
FIG. 1 is a block diagram of a dual-mode mobile communication device.

Turning now to the drawing figures, FIG. 1 is a block diagram of a dual-mode mobile communication device 10. The dual-mode device 10 includes a transceiver 11, a microprocessor 38, a display 22, Flash memory 24, RAM memory 26, auxiliary input/output (I/O) devices 28, a serial port 30, a keyboard 32, a speaker 34, a microphone 36, a short-range wireless communications sub-system 40, and may also include other device sub-systems 42. The transceiver 11 preferably includes transmit and receive antennas 16, 18, a receiver 12, a transmitter 14, one or more local oscillators 13, and a digital signal processor 20. Within the Flash memory 24, the device 10 preferably includes a plurality of software modules 24A-24N that can be executed by the microprocessor 38 (and/or the DSP 20), including a voice communication module 24A, a data communication module 24B, and a plurality of other operational modules 24N for carrying out a plurality of other functions.

The mobile communication device 10 is preferably a two-way communication device having voice and data communication capabilities. Thus, for example, the device may communicate over a voice network, such as any of the many known analog or digital cellular networks, and may also communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the voice and data network 19, and includes the receiver 12, the transmitter 14, the one or more local oscillators 13 and may also include the DSP 20. The DSP 20 is used to send and receive signals to and from the transmitter 14 and receiver 12, and is also utilized to receive control information from the transmitter 14 and to provide control information to the receiver 12. If the voice and data communications occur at a single frequency, or closely spaced set of frequencies, then a single local oscillator 13 may be used in conjunction with the transmitter 14 and receiver 12. Alternatively, if different frequencies are utilized for voice communications versus data communications, then a plurality of local oscillators 13 can be used to generate a plurality of frequencies corresponding to the voice and data networks 19. Although two antennas 16, 18 are depicted in FIG. 1, the mobile device 10 could be used with a single antenna structure. Information, which includes both voice and data information, is communicated to and from the communication module 11 via a link between the DSP 20 and the microprocessor 38.

The detailed design of the communication subsystem 11, such as frequency band, component selection, power level, etc., will be dependent upon the communication network 19 in which the device is intended to operate. For example, a device 10 intended to operate in a North American market may include a communication subsystem 11 designed to operate with the Mobitex™ or DataTAC™ mobile data communication networks and also designed to operated with any of a variety of voice communication networks, such as AMPS. TDMA, CDMA, PCS, etc., whereas a device 10 intended for use in Europe may be configured to operate with the General Packet Radio Service (GPRS) data communication network and the GSM voice communication network. Other types of data and voice networks, both separate and integrated, may also be utilized with the mobile device 10.

Depending upon the type of network 19 (or networks), the access requirements for the dual-mode mobile device 10 may also vary. For example, in the Mobitex and DataTAC data networks, mobile devices are registered on the network using a unique identification number associated with each device. In GPRS data networks, however, network access is associated with a subscriber or user of a device 10. A GPRS device typically requires a subscriber identity module ("SIM"), which is required in order to operate the device 10 on the GPRS network. Local or non-network communication functions (if any) may be operable without the SIM device, but the device 10 will be unable to carry out any functions involving communications over the data network 19, other than any legally required operations, such as 911 emergency calling.

After any required network registration or activation procedures have been completed, the dual-mode device 10 may send and receive communication signals, including both voice and data signals, over the network 19 (or networks). Signals received by the antenna 16 from the communication network 19 are routed to the receiver 12, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the communication network 19 (or networks) via the antenna 18. Although a single transceiver 11 is shown in FIG. 1 for both voice and data communications, it is possible that the device 10 may include two distinct transceivers, a first transceiver for transmitting and receiving voice signals, and a second transceiver for transmitting and receiving data signals.

In addition to processing the communication signals, the DSP 20 also provides for receiver and transmitter control. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11.

The microprocessor 38 preferably manages and controls the overall operation of the dual-mode mobile device 10. Many types of microprocessors or micro-controllers could be used here, or, alternatively, a single DSP 20 could be used to carry out the functions of the microprocessor 38. Low-level communication functions, including at least data and voice communications, are performed through the DSP 20 in the transceiver 11. Other, high-level communication applications, such as a voice communication application 24A, and a data communication application 24B may be stored in the Flash memory 24 for execution by the microprocessor 38. For example, the voice communication module 24A may provide a high-level user interface operable to transmit and receive voice calls between the dual-mode mobile device 10 and a plurality of other voice devices via the network 19. Similarly, the data communication module 24B may provide a high-level user interface operable for sending and receiving data, such as e-mail messages, files, organizer information, short text messages, etc., between the dual-mode mobile device 10 and a plurality of other data devices via the network 19.

The microprocessor 38 also interacts with other device subsystems, such as the display 22, Flash memory 24, random access memory (RAM) 26, auxiliary input/output (I/O) subsystems 28, serial port 30, keyboard 32, speaker 34, microphone 36, a short-range communications subsystem 40 and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 may be used for both communication-related functions, such as entering a text message for transmission over a data communication network, and device-resident functions, such as a calculator or task list or other PDA type functions.

Operating system software used by the microprocessor 38 is preferably stored in a persistent store, such as Flash memory 24. In addition to the operating system, which controls all of the low-level functions of the device 10, the Flash memory 24 may include a plurality of high-level software application programs, or modules, such as a voice communication module 24A, a data communication module 24B, an organizer module, or any other type of software module 24N. The Flash memory 24 also may include a file system for storing data. These modules are executed by the microprocessor 38 and provide a high-level interface between a user of the device and the device, This interface typically includes a graphical component provided through the display 22, and an input/output component provided through the auxiliary I/O 28, keyboard 32, speaker 34, and microphone 36. The operating system, specific device applications or modules, or parts thereof, may be temporarily loaded into a volatile store, such as RAM 26 for faster operation. Moreover, received communication signals may also be temporarily stored to RAM 26, before permanently writing them to a file system located in the persistent store 24.

An exemplary application module 24N that may be loaded onto the dual-mode device 10 is a personal information manager (PIM) application providing PDA functionality, such as calendar events, appointments, and task items. This module 24N may also interact with the voice communication module 24A for managing phone calls, voice mails, etc., and may also interact with the data communication module for managing e-mail communications and other data transmissions. Alternatively, all of the functionality of the voice communication module 24A and the data communication module 24B may be integrated into the PIM module.

The Flash memory 24 preferably provides a file system to facilitate storage of PIM data items on the device. The PIM application preferably includes the ability to send and receive data items, either by itself, or in conjunction with the voice and data communication modules 24A, 24B, via the wireless network 19. The PIM data items are preferably seamlessly integrated, synchronized and updated, via the wireless network 19, with a corresponding set of data items stored or associated with a host computer system, thereby creating a mirrored system for data items associated with a particular user.

The mobile device 10 may also be manually synchronized with a host system by placing the device 10 in an interface cradle, which couples the serial port 30 of the mobile device 10 to the serial port of the host system. The serial port 30 may also be used to enable a user to set preferences through an external device or software application, or to download other application modules 24N for installation. This wired download path may be used to load an encryption key onto the device, which is a more secure method than exchanging encryption information via the wireless network 19.

Additional application modules 24N may be loaded onto the dual-mode device 10 through the network 19, through an auxiliary I/O subsystem 28, through the serial port 30, through the short-range communications subsystem 40, or through any other suitable subsystem 42, and installed by a user in the Flash memory 24 or RAM 26. Such flexibility in application installation increases the functionality of the device 10 and may provide enhanced on-device functions, communication-related functions, or both. For example, secure communication applications may enable electronic commerce functions and other such financial transactions to be performed using the device 10.

When the dual-mode device 10 is operating in a data communication mode, a received signal, such as a text message or a web page download, will be processed by the transceiver 11 and provided to the microprocessor 38, which will preferably further process the received signal for output to the display 22, or, alternatively, to an auxiliary I/O device 28. A user of dual-mode device 10 may also compose data items, such as email messages, using the keyboard 32, which is preferably a complete alphanumeric keyboard laid out in the QWERTY style, although other styles of complete alphanumeric keyboards such as the known DVORAK style may also be used. User input to the device 10 is further enhanced with a plurality of auxiliary I/O devices 28, which may include a thumbwheel input device, a touchpad, a variety of switches, a rocker input switch, etc. The composed data items input by the user may then be transmitted over the communication network 19 via the transceiver 11.

When the dual-mode device 10 is operating in a voice communication mode, the overall operation of the device 10 is substantially similar to the data mode, except that received signals are preferably output to the speaker 34 and voice signals for transmission are generated by a microphone 36. Alternative voice or audio I/O subsystems, such as a voice message recording subsystem, may also be implemented on the device 10. Although voice or audio signal output is preferably accomplished primarily through the speaker 34, the display 22 may also be used to provide an indication of the identity of a calling party, the duration of a voice call, or other voice call related information. For example, the microprocessor 38, in conjunction with the voice communication module and the operating system software, may detect the caller identification information of an incoming voice call and display it on the display 22.

A short-range communications subsystem 40 may also be included in the dual-mode device 10. For example, the subsystem 40 may include an infrared device and associated circuits and components, or a Bluetooth™ short-range wireless communication module to provide for communication with similarly enabled systems and devices.

Figure 2:
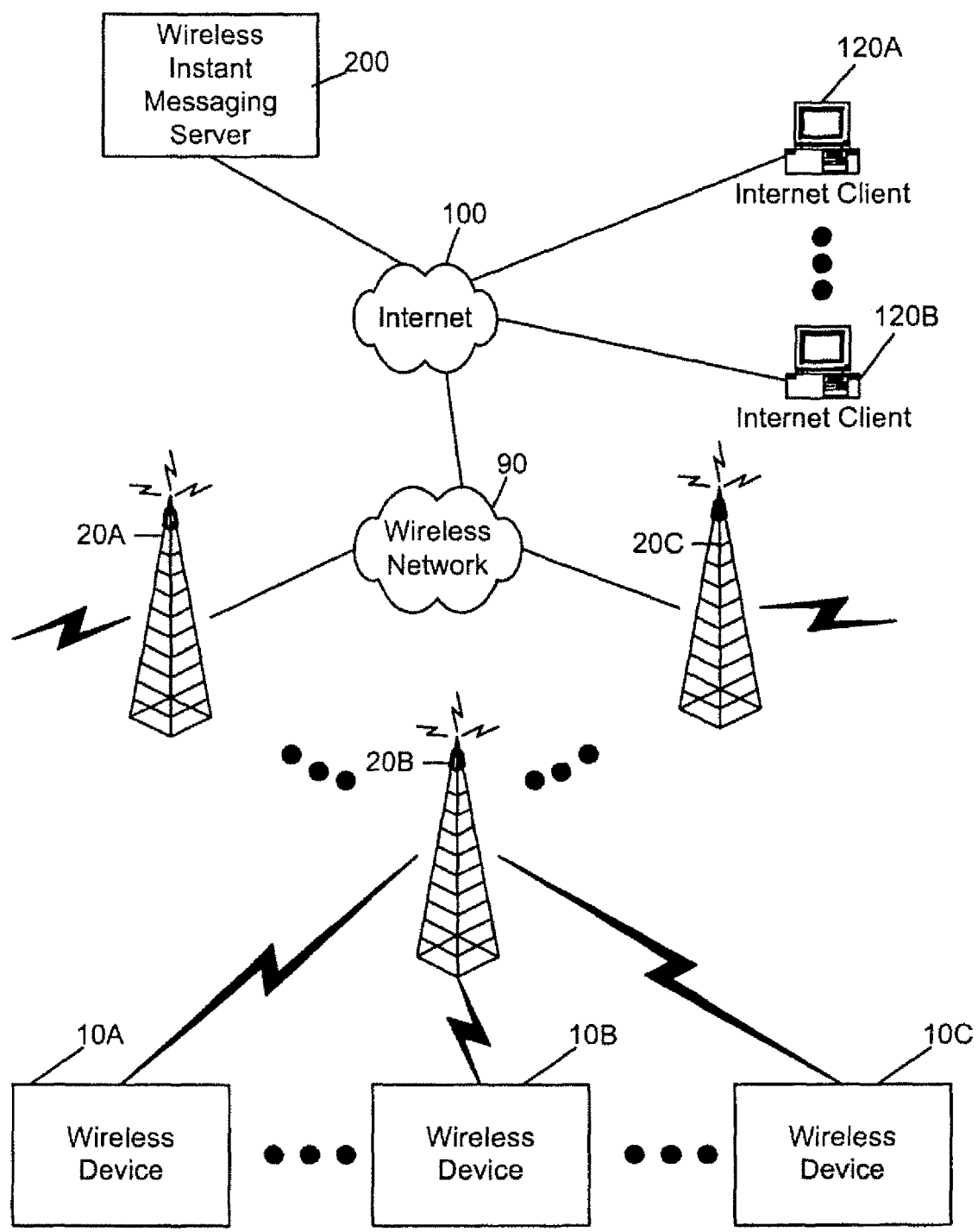
FIG. 2 is a block diagram of an exemplary wireless instant messaging system in accordance with the present invention.

FIG. 2 is a block diagram of an exemplary wireless instant messaging system in accordance with the present invention. Wireless devices 10 communicate with base stations 20 wirelessly using radio waves. The base stations 20 communicate via a wireless network 90, which in turn communicates via the Internet 100 with a wireless instant messaging server 200 and Internet-based instant messaging clients 120.

Figure 3:
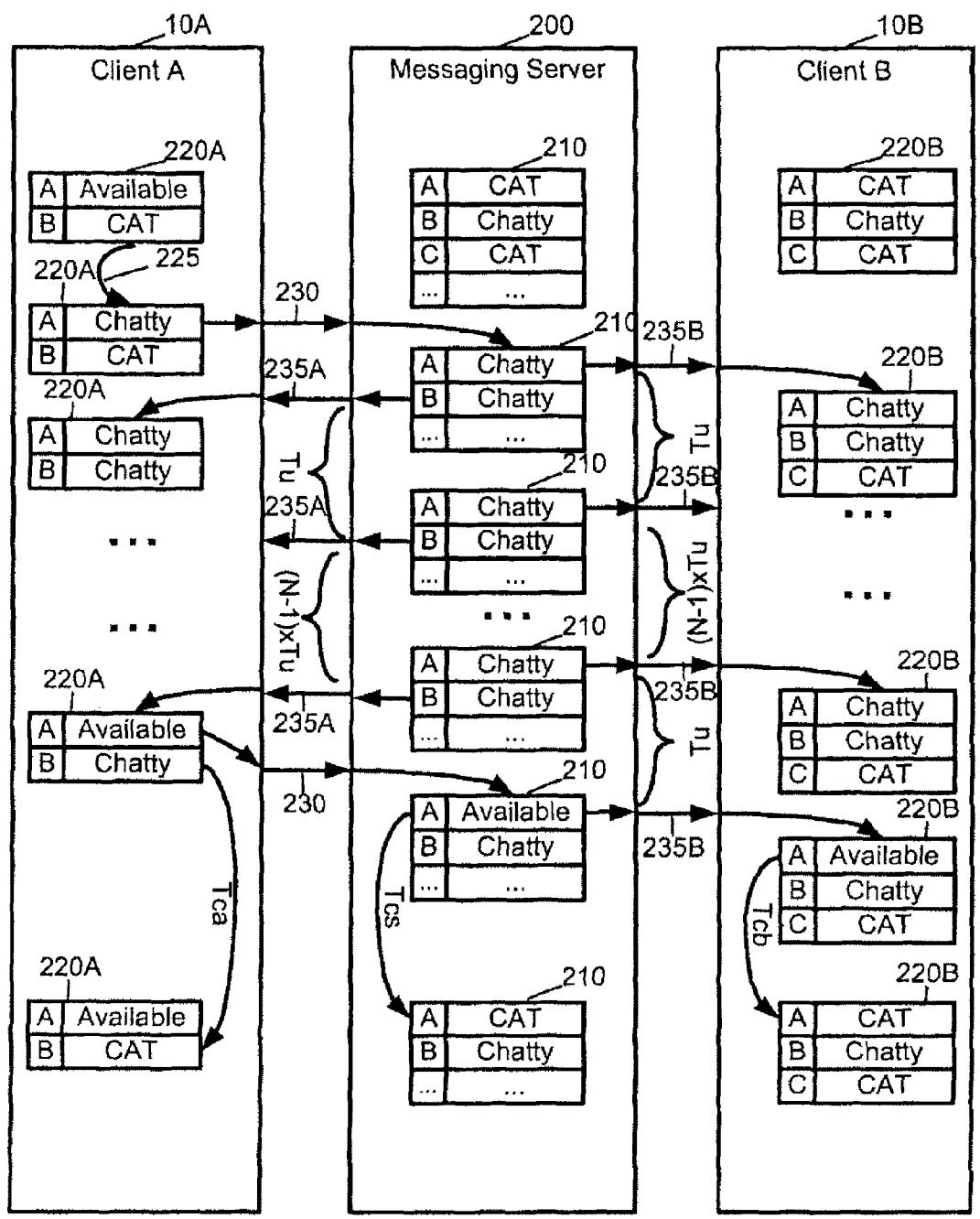
FIG. 3 is an interaction diagram illustrating steps of a first embodiment of a method of wireless instant messaging in accordance with the present invention.

FIG. 3 is an interaction diagram illustrating steps of a first embodiment of a method of wireless instant messaging in accordance with the present invention. Messaging server 200 communicates with client applications on wireless devices A and B (10A and 10B), as well as with other client applications, such as C. In FIG. 3, an arrow between messaging server 200 and clients 10A, B illustrate communications. The relative time between these communications is illustrated by time flowing generally downward so that if a first arrow is higher than a second arrow in FIG. 3, this is meant to illustrate that the first communication occurred before the second communication.

Messaging server 200 keeps track of presence information. As illustrated, initially messaging server 200 has a server presence table 210 having one row per wireless client A, B, C, etc., wherein each row stores the presence state for each wireless client. As shown, client 10B is initially in the "chatty" state according to table 210, whereas clients 10A and C are in the "CAT" state (named after Shrödinger's cat) according to table 210. The CAT state is also referred to herein as the unknown state. While represented in the "CAT" state, the presence information for a client is understood to be neither available nor unavailable, i.e., its state is undetermined, and the messaging server 200 preferably does not propagate presence information to any client in this state. The "CAT" state is maintained until the state of the client is "observed," in which case the undetermination is resolved. The act of "observing" a client may cause the state of the client to change. The "CAT" state is thus a pseudo-state that can be used by both the messaging server 200 and clients 10A, B. Optionally, the "CAT" state can be displayed to the user of client devices 10A, B, for instance, in co-operation with a "buddy" list. The "CAT" state is preferably not communicated between messaging server 200 and client 10A, B. In addition, representing the state of a client with the "CAT" state enables wireless presence information to operate with the lack of state information for that particular client.

In a similar manner to how presence information is maintained at the messaging server 200, each client 10A, B maintains a client presence table 220A, B, wherein each row of the client presence table 220A stores the presence state for a wireless client. Instead of keeping track of all clients as was the case with the server presence table 210, the client presence tables 220A, B preferably only keep track of the presence information for select wireless messaging correspondents, for instance only those correspondents found on a "buddy" list. Also shown in client presence tables 220A, B is the local client state, which need not necessarily be stored in the same table as the select clients. As shown in table 220A, for example, client 10B is initially in the "CAT" state, whereas client 10A is in the "Available" state. Table 220B also shows that client 10A is initially in the "CAT" state, whereas client 10B is in the "Chatty" state.

In FIG. 3, client 10A changes its state from "Available" to "chatty" in response to some trigger 225—for instance when the user of client 10A activates the instant messaging application. Client 10A then communicates 230A its new state information to the messaging server 200, which tracks this information and updates the change in table 210.

At messaging server 200, both clients 10A and 10B are now in the "chatty" state. Messaging server 200 sends client state update messages to all clients that are in the "chatty" state. As shown, client 10B receives an update 235B indicating that client 10A is now in the "chatty" state, and updates client table 220B accordingly. Similarly, client 10A receives an update 235A indicating that client 10B is now in the "chatty" state. Thus, by communicating its state to messaging server 200, client 10A effectively "observes" the state of client 10B thereby resolving the indeterminacy of the original "CAT" state for client 10B in table 220A of client 10A.

While clients 10A and 10B remain in the "chatty" state, as indicated in the server presence table 210, messaging server 200 periodically (with period Tu) sends updates 235B and 235A to clients 10B and 10A, respectively. The updates preferably include all non-CAT states of buddies, and optionally may include all "chatty" states, as well as other optional information (bandwidth permitting).

After N updates, client 10A changes state from "chatty" to "available" in table 220A, for instance as a result of the user of client 10A stopping the instant messaging application. Client 10A therefore sends update 230A to messaging server 200, which continues to send periodic (with period Tu) update messages 235B to client 10B since client 10B is in the "chatty" state.

Because client 10A is no longer in the "chatty" state in table 210, however, after a "CAT" timeout interval Tcs has expired, client 10A is represented by the "CAT" state in table 210. Similarly, because the state of client 10B is no longer being updated in table 220A, after a "CAT" timeout interval Tca has expired, the state of client 10B is represented by the "CAT" state in table 220A. The same operation occurs after a timeout interval Tcb at client 10B, so that client 10A is represented with the "CAT" state in table 220B. Even though client B is in the "chatty" state both in table 210 and 220B, messaging server 200 does not send periodic updates to client 10B because both client 10A and 10C have the "CAT" state in table 210.

Figure 4:
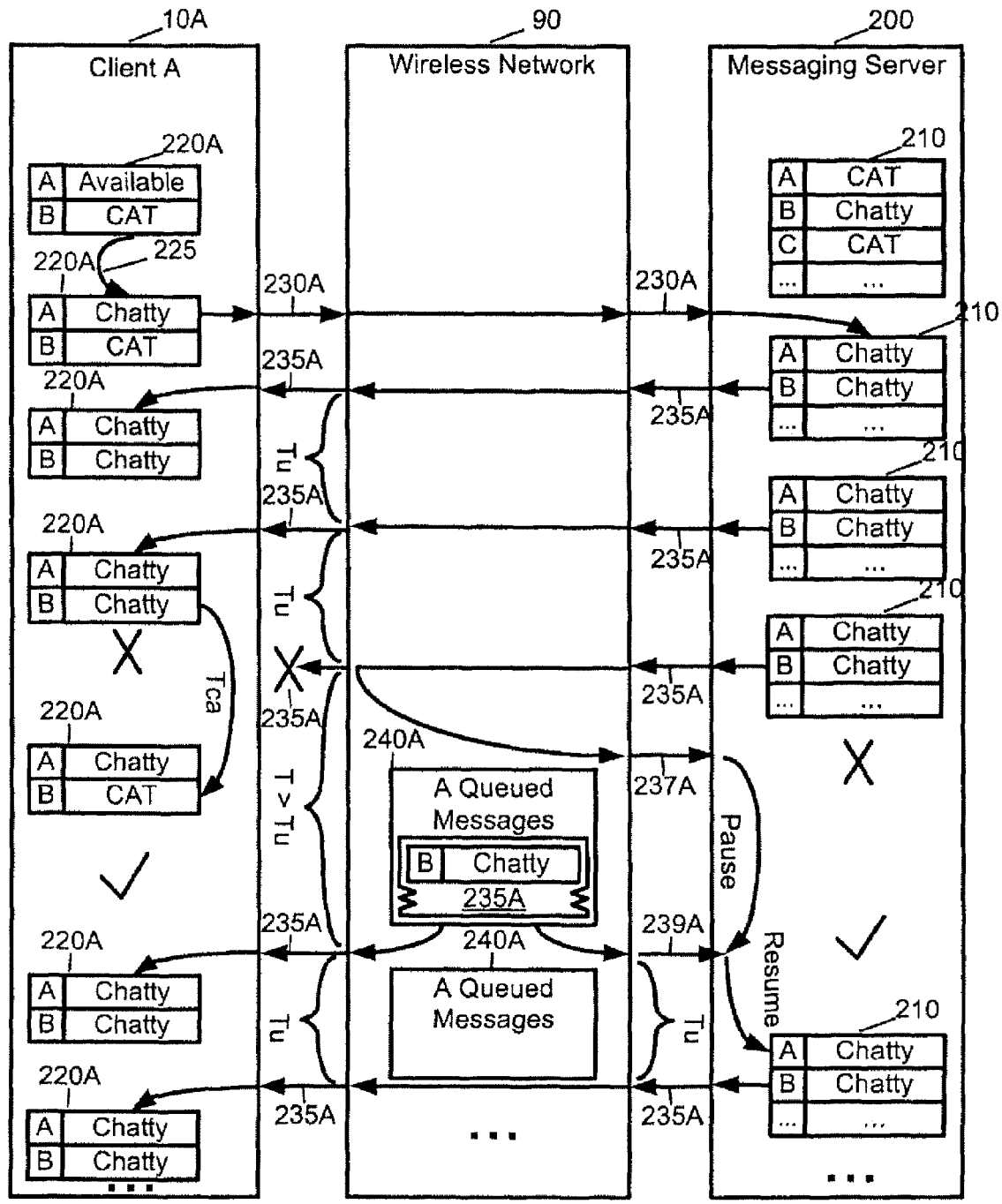
FIG. 4 is an interaction diagram illustrating steps of a second embodiment of a method of wireless instant messaging in accordance with the present invention.

FIG. 4 is an interaction diagram illustrating steps of a second embodiment of a method of wireless instant messaging in accordance with the present invention. FIG. 4 shows communications between messaging server 200 and client 10A illustrating in greater detail steps surrounding updates queued by wireless network 90 when client 10A falls out of coverage. Client 10A and messaging server 200 originally have presence information tables 220A and 210, respectively. As was the case in FIG. 3, a trigger 225 at client 10A causes client 10A to enter the "chatty" state. Client 10A then changes its state from "Available" to "chatty" in response to the trigger 225—for instance when the user of client 10A activates the instant messaging application. Client 10A then communicates 230A its new state information to the messaging server 200, which tracks and updates the change in table 210.

At messaging server 200, both clients 10A and 10B are now in the "chatty" state. Messaging server 200 sends client state update messages to all clients that are in the "chatty" state. Because only client 10A is shown in FIG. 4, only update messages sent to client 10A are shown. Client 10A receives an update 235A indicating that client 10B is now in the "chatty" state, and updates client table 220A accordingly.

While client 10A remains in the "chatty" state, as indicated in the server presence table 210, messaging server 200 periodically (with period Tu) sends updates 235A to client 10A. However, as shown, the third update does not reach client 10A because client 10A has gone out of coverage—as illustrated by the X. As a result, wireless network 90 preferably queues update message 235A in queue 240A for client 10A, and sends a queued message status message 237A back to messaging server 200.

Preferably, upon receiving a queued message status message 237A, messaging server 200 pauses the periodic transmission of update messages to client 10A. This ensures that the capacity of wireless network 90 is not overflowed by update messages 235A for client 10A for the duration of time client 10A is out of coverage—illustrated as a portion of the duration T>Tu.

Finally, after client 10A returns to coverage—illustrated by the check mark—queued message 235A in queue 240A is sent to client 10A by wireless network 90. The wireless network 90 also sends a queued message delivered message 239A to messaging server 200

Preferably, upon receiving a queued message delivered message 239A, messaging server 200 resumes the periodic transmission of update messages to client 10A.

Figure 5:
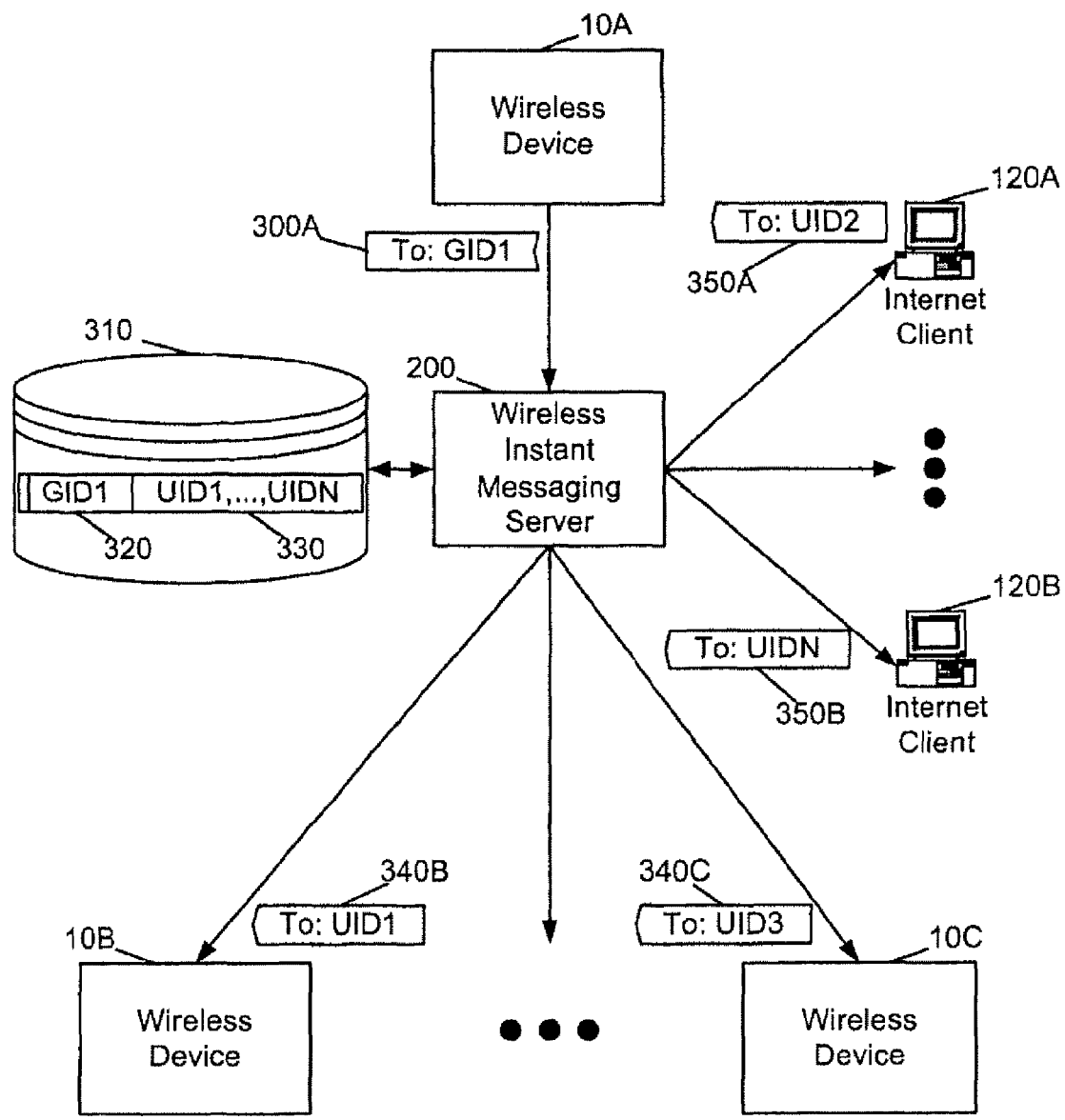
FIG. 5 is an interaction diagram illustrating steps of a third embodiment of a method of wireless instant messaging in accordance with the present invention.

FIG. 5 is an interaction diagram illustrating steps of a third embodiment of a method of wireless instant messaging in accordance with the present invention.

A wireless device 10A sends a single message 300A addressed to a group GID1 via wireless messaging server 200. Group GID1 is a unique identifier which is resolved by messaging server by consulting a database 310 that relates group ids such as GID1 320 to user ids 330, such as UID1, . . . , UIDN. As shown, messaging server 200 then sends messages 340B-C to each wireless device having user ids 330, as well as sending messages 350A-B to internet clients 120A-B. This mechanism ensures that wireless device 10A only needs to transmit one wireless message 300A in order to reach multiple wireless users 10B-C and internet users 120A-B.

The above-described embodiments of the present invention are intended to be examples only. Those of skill in the art may effect alterations, modifications and variations to the particular embodiments without departing from the scope of the invention.

The invention claimed is:

1. A method relating to instant messaging clients that are configured to transmit, to a server, presence information indicating that the respective client is in a communicative state in which the client is receptive to communicating with the other clients, the clients including first and second clients, the method comprising the following steps performed by the server:

determining, for each client, that the respective client is in a communicative state if presence information is received from the client;

determining, for each client, that the respective client is in an unknown state if a predetermined time period passes after the receipt of presence information from the client without receiving additional presence information from the client, the communicative state and the unknown state being possible presence states of the clients;

transmitting a notification to the second client of the presence state of the first client when both the first client and the second client are in a communicative state; and refraining from transmitting the notification to the second client when the first client is in the unknown state.

2. The method of claim 1, further comprising:

refraining from transmitting the notification when the second client is in the unknown state.

3. The method of claim 1, wherein the server repeats the transmitting step periodically at a uniform time interval.

4. The method of claim 3, further comprising:
in response to each repetition of the transmitting step, the second client updating a record of the presence state of the first client that is stored on the second client.

5. The method of claim 1, further comprising:
the server refraining from transmitting any communication to the first client when the first client is in the unknown state.

6. The method of claim 1, further comprising:
refraining from transmitting the notification to the second client when the instant messaging application of the first client is turned off.

7. The method of claim 1, further comprising:
the first client notifying the second client directly of the first client's presence state.

8. The method of claim 7, wherein said notifying includes notifying the second client of the first client's presence state even when the first client is in the unknown state.

9. The method of claim 7, wherein said notifying includes the first client specifying whether the first client is in an available state or a chatty state.

10. The method of claim 1, wherein the transmitting step includes specifying to the second client whether the first client is in an available state or a chatty state.

11. The method of claim 1, wherein the first and second clients are in the same buddy list, the buddy list being stored on the server.

12. The method of claim 1, further comprising:
receiving a queued message status message when the notification is not received at the second client, the queued message status message indicating that the notification is placed in a queue.

13. The method of claim 12, further comprising:
upon receiving the queued message status message, refraining from transmitting the notification in the queue until the second client returns to the communicative state.

14. A method relating to instant messaging clients, including first and second clients, the method comprising the following steps performed by the server:
determining whether each client is in a communicative state, in which the client is receptive to communicating with the other clients, or in an unknown state, wherein the unknown state is determined if a predetermined time period passes after receiving presence information from a client without receiving additional presence information from the client;
notifying the second client which of the states the first client is in when both the first client and the second client are in a communicative state; and
refraining from notifying the second client which of the states the first client is in when the first client is in the unknown state.

15. The method of claim 14, wherein the clients are configured to transmit, to the server, presence information indicating that the respective client is in the communicative state, and the determining step includes:
determining that the respective client is in the communicative state if presence information was received from the client over a preceding predetermined time period and that the client is in the unknown state if presence information was not received from the client over the preceding predetermined time period.

* * * * *

UNITED STATES PATENT AND TRADEMARK OFFICE
CERTIFICATE OF CORRECTION

| | | |
|---|---|---|
| PATENT NO. | : 7,835,759 B2 | Page 1 of 1 |
| APPLICATION NO. | : 12/108649 | |
| DATED | : November 16, 2010 | |
| INVENTOR(S) | : Bells et al. | |

It is certified that error appears in the above-identified patent and that said Letters Patent is hereby corrected as shown below:

Title Page, Item (63)

Please add this information to the Related U.S. Application Data

-- Provisional application No. 60/412,818, filed on Sep. 24, 2002. --

Signed and Sealed this

Fifteenth Day of February, 2011

David J. Kappos
*Director of the United States Patent and Trademark Office*